UNITED STATES PATENT OFFICE.

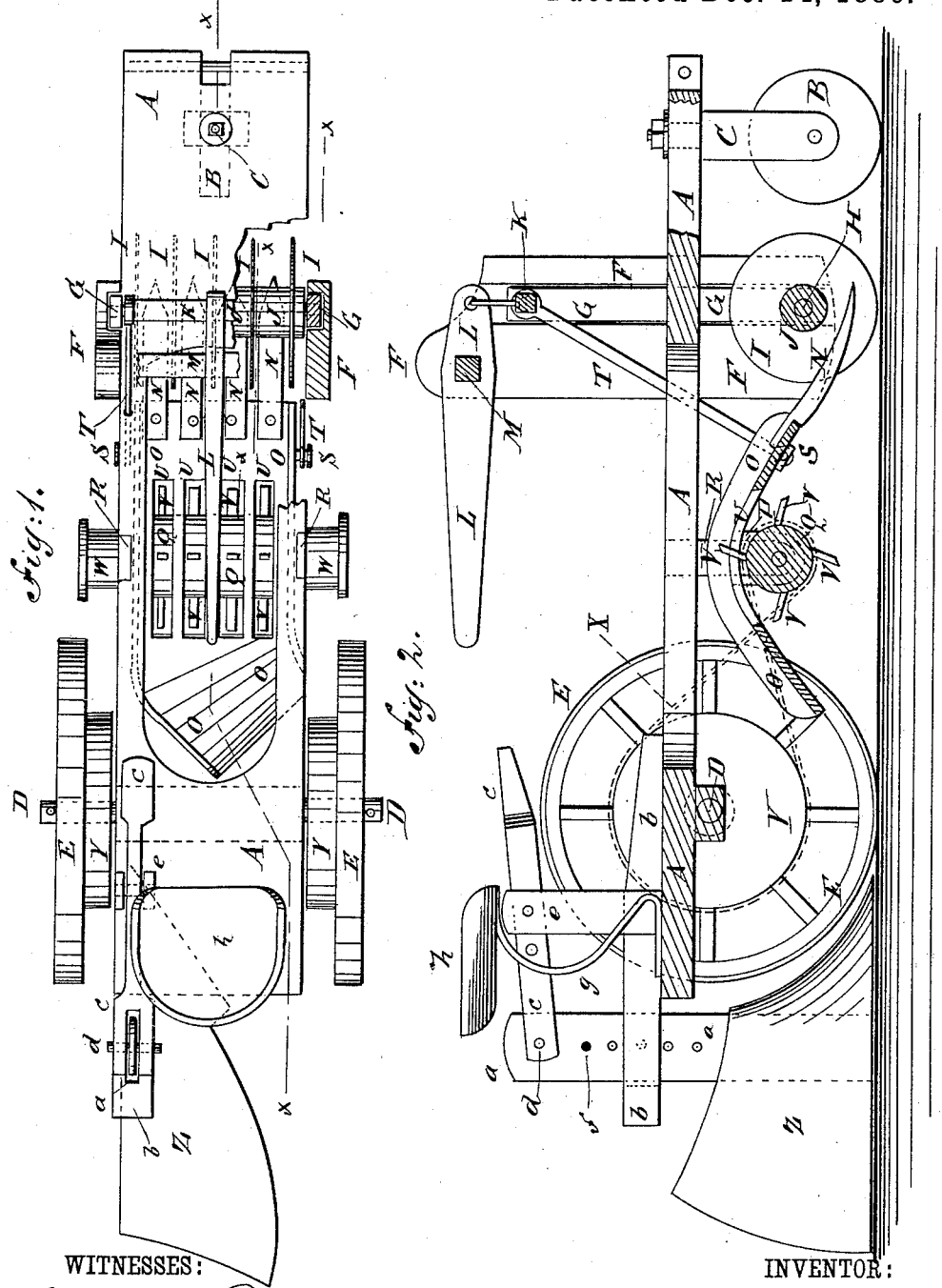

DANIEL W. EVANS, OF SIMS, DAKOTA TERRITORY, ASSIGNOR TO HIMSELF AND SIDNEY HEAL, OF SHERMAN, OHIO.

COMBINED PULVERIZER AND PLOW.

SPECIFICATION forming part of Letters Patent No. 354,507, dated December 14, 1886.

Application filed May 18, 1886. Serial No. 202,535. (No model.)

*To all whom it may concern:*

Be it known that I, DANIEL W. EVANS, of Sims, in the county of Morton and Territory of Dakota, have invented a new and useful Improvement in Combined Pulverizers and Plows, of which the following is a full, clear, and exact description.

Reference is to be had to the accompanying drawings, forming a part of this specification, in which similar letters of reference indicate corresponding parts in both the figures.

Figure 1 is a plan view of my combined pulverizer and plow, parts being broken away. Fig. 2 is a sectional side elevation of the same, taken through the broken line $x\,x\,x\,x\,x$, Fig. 1.

The object of this invention is to provide combined pulverizers and plows constructed in such a manner as to cut the furrow-slices into strips, pulverize them, and then turn them under.

The invention consists in the construction and combination of various parts of the combined pulverizer and plow, as will be hereinafter fully described.

A represents the frame of the machine, to the forward end of which the draft is applied, and which may be provided with a tongue, if desired. The forward end of the frame A is supported by a wheel, B, the upper end of the standard C of which is pivoted to the forward part of the said frame A. The rear part of the frame A is attached to and supported by the axle D of the drive-wheels E.

To the opposite sides of the forward part of the frame A are attached wide standards F or upright frames, which project above and below the said frame, and in the inner sides of the forward parts of which are formed vertical grooves in which slide bars G. To the lower ends of the sliding bars G are attached the ends of a shaft, H, upon which are placed five (more or less) loose circular colters, I. The colters I are kept at a proper distance apart by tubular washers J, placed between them upon the shaft H. The upper ends of the sliding bars G are connected by a cross-bar, K, with the center of which is connected by U-bolts, staples, clevises, or other suitable couplings the end of a lever, L, attached to a shaft, M. The ends of the shaft M are journaled in bearings in the upwardly-projecting rear parts of the standards F, so that the colters I can be raised from the ground by operating the said lever L. With this construction, as the machine is drawn forward, the furrow-slice is cut into narrow strips by the circular colters I.

Between the lower parts of the colters I are placed the points of narrow slightly curved plows N, the shanks of which are attached to the forward end of the arched trough O, so that the strips of the furrow-slice will pass through the said trough and fall from its rear end in front of the turn-plow, hereinafter described. The trough O has upwardly-projecting flanges along its side edges to keep the strips of the furrow-slice from falling off the said edges. To the opposite sides of the middle part of the trough O are rigidly attached the upper ends of two hangers, P, the lower ends of which are perforated to receive and rock upon the journals of the cylinder Q, which journals revolve in bearings in the lower ends of hangers R, rigidly attached at their upper ends to the opposite edges of the middle part of the frame A.

To the under side of the forward part of the trough O is attached a cross-bar, S, the ends of which project, and to them are attached the lower ends of two bars, T. The upper ends of the bars T are attached to the end parts of the cross-bar K, so that the forward end of the trough O and the narrow plows N will be raised by the same movement that raises the circular colters I. The arched middle part of the trough O has slots U, formed in it in line with the narrow plows N, to receive the fingers V, attached to the cylinder, as the said cylinder revolves. To the journals of the cylinder Q are attached small pulleys W, around which pass endless belts X. The belts X are crossed and pass around large pulleys Y, attached to the inner sides of the drive-wheels E, so that the movement of the fingers V will be much faster than the rearward movement of the strips of the furrow-slice through the trough O, and the said fingers will thus be made to tear in pieces and pulverize the strips of the furrow-slice as they move back through the said trough. The rear end of the trough O is inclined toward the ploughed land side of the machine, so as to discharge the pulverized soil directly in front of the plow Z, which is an ordinary turn-plow or breaking-plow, except that it has no beam.

The standard $a$ of the plow Z passes up through a slot in the rear end of the bar $b$, the forward end of which is rigidly attached to the landside rear corner of the frame A. The upper end of the standard $a$ passes through the slotted rear end of the lever $c$, and is pivoted to the said lever by a pin or bolt, $d$. The lever $c$ at its middle part is pivoted to the upper end of a short standard, $e$, the lower end of which is attached to the bar $b$, or to the frame A. Several holes are formed in the standard $a$, to receive a pin, $f$, to come in contact with the bar $b$, and thus limit the depth to which the plow Z can enter the ground.

To the rear end of the frame A is attached the lower end of the spring-standard $g$, to the upper end of which is attached the driver's seat $h$. With this construction the furrow-slice will be cut into strips, pulverized, and deposited in front of the plow, and then turned under by the said plow.

Having thus fully described my invention, I claim as new and desire to secure by Letters Patent—

1. In a combined pulverizer and plow, the combination, with the frame A, mounted upon wheels, of the grooved standards F, attached to the said frame, the sliding bars G, and the series of circular colters I, connected with the said sliding bars, substantially as herein shown and described, whereby the furrow-slice will be cut into strips before being separated from the ground, as set forth.

2. In a combined pulverizer and plow, the combination, with the frame A, mounted upon wheels, the grooved standards F, attached to the said frame, the sliding bars G, and the circular colters I, carried by the said sliding bars, of the series of narrow plows N, the slotted arched trough O, carrying the said narrow plows, the cylinder Q, the fingers V, attached to the said cylinder, and the pulleys and belts W Y X, connecting the said cylinder with the drive-wheel, substantially as herein shown and described, whereby the furrow-slice will be cut into strips, raised from the ground, pulverized, and deposited upon the ground, as set forth.

3. In a combined pulverizer and plow, the combination, with the frame A, mounted upon wheels, the grooved standards F, attached to the said frame, the sliding bars G, the circular colters carried by the said sliding bars, the slotted arched trough O, the narrow plows N, carried by the said trough, the cylinder Q, having fingers V, and driven from the drive-wheels by pulleys and belts, of the plow Z, the standard $a$, the slotted bar $b$, and the lever $c$, substantially as herein shown and described, whereby the pulverized furrow-slice will be turned under, as set forth.

4. The combination, with a plow and a wheel-supported frame carrying the same, of a series of vertically-adjustable colters, a series of narrow plows having their forward ends extending between said colters, an apron extending from the rear ends of said narrow plows to the mold-board side of the main plow, and pulverizing devices between the colters and main plow, substantially as shown and described.

5. The combination, with a plow and its wheel-supported frame, a series of adjustable colters, and a series of narrow plows extending backward from said colters, of a centrally-slotted apron extending rearwardly from said narrow plows, a cylinder journaled beneath said apron, pins in said cylinder extending through the slots in the apron, and means for revolving said cylinder, substantially as shown and described.

DANIEL W. EVANS.

Witnesses:
J. H. HEUSEL,
GEO. W. ADE.